Jan. 19, 1943.  J. ENGLISH  2,308,745

PIPE JOINT

Filed Sept. 29, 1941

Inventor:
John English
By: Glascock Downing & Seebold
Attys.

Patented Jan. 19, 1943

2,308,745

UNITED STATES PATENT OFFICE 2,308,745

PIPE JOINT

John English, Birmingham, England, assignor to Chance Brothers and Co. Limited, Smethwick, Birmingham, England Application September 29, 1941, Serial No. 412,881 In Great Britain October 7, 1940

6 Claims. (Cl. 285—91)

This invention has for its object to provide improved means for effecting fluid tight joints at the ends of flanged glass pipes and pipe fittings in a manner which minimises risk of dangerously straining or fracturing the pipes or fittings in the event of their not being accurately aligned.

The invention comprises a two part annular junction piece which is made from glass and has spherical interfaces and flat outer faces, and which is adapted to be mounted between flat faces of the glass parts to be connected, and means embedded in the two parts of the junction piece whereby these parts can be disengageably associated with the corresponding parts to be connected.

The invention also comprises a junction piece as specified in the preceding paragraph and provided with means through which liquid or viscous lubricating or sealing substance can be supplied to the interfaces, or to both the interfaces and the outer faces of the junction piece.

Figure 1:
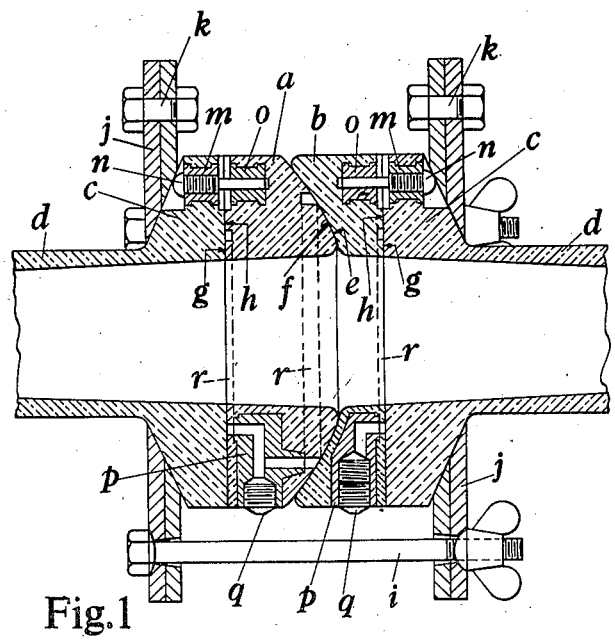
Figure 2:
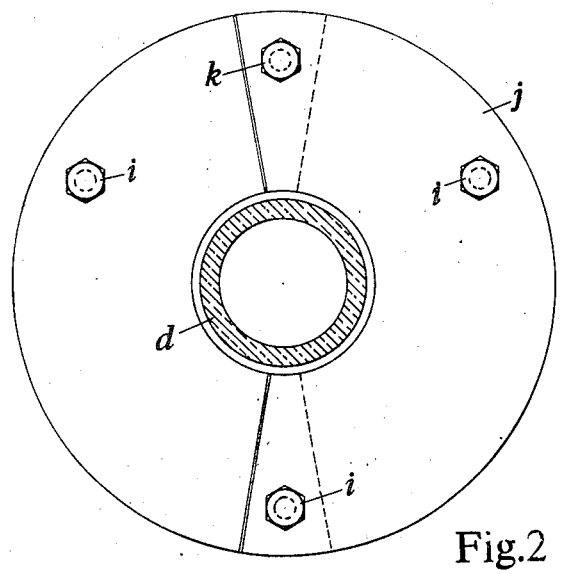

In the accompanying sheet of explanatory drawings, Figure 1 is a sectional elevation, and Figure 2 an end view, of a pipe joint constructed in accordance with the invention.

In carrying the invention into effect as shown, we employ a junction piece comprising a pair of annular members $a$, $b$ adapted to be mounted between flanges $c$ on a pair of glass pipe ends $d$ to be connected together, or between the flanged end of a pipe and a valve or other fitting to be included in a pipe line. Each of the annular members $a$, $b$ is made from glass. The face $e$ of the member $a$ is made to a convex form, and the corresponding face $f$ of the other member $b$ is made to a complementary concave form. These faces $e$, $f$ are the interfaces of the junction piece and are made to fit each other accurately. The other or outer faces $g$ of the members $a$, $b$ are made flat so that they can fit closely against flat end faces $h$ on the flanged pipe ends $d$ or other parts to be connected together.

When it is required to interconnect a pair of pipe ends as $d$, the latter and the members $a$, $b$ forming the junction piece may be held together by bolts $i$ passing through separate metal or other collars $j$ mounted on the pipe ends in contact with conical or other outer sides of the flanges $c$ on the pipe ends, the inner peripheral surfaces of the collars being of similar shape to, and adapted to lie in close contact with, the outer sides of the said flanges. The collars are preferably of split form, and each of them may be composed of two segmental parts which are secured together around the corresponding pipe end $d$ by a short bolt $k$ passing through adjacent interengaging portions of the said parts. Alternatively the collars $j$ may be dispensed with and the bolts $i$ arranged to pass through the pipe end flanges $c$ which in this case are of larger diameter than the annular members $a$, $b$ forming the junction piece. When the bolts $i$ are tightened any lack of alignment of the pipe ends $d$ is accommodated by relative movement of the interfaces $e$, $f$ of the junction piece, and risk of dangerous straining of the pipe ends is thereby minimised.

When it is required to interconnect a pipe end and a valve or other fitting, the junction piece $a$, $b$ is mounted between a flat end face of a flange on the pipe end and a similar face on the fitting, and is secured by bolts or screws arranged to secure the pipe flange or a collar on the pipe to the fitting.

Preferably each of the two members $a$, $b$ of the junction piece is attached to or located on the corresponding pipe end or fitting before the two pipe ends or the pipe end and fitting are assembled. To facilitate this we embed in each of the pipe end flanges $c$ or the pipe end flange and fitting two or more suitably spaced metal nuts $m$ through which screws $n$ can be inserted, and we also embed in the members $a$, $b$ of the junction piece metal bushes $o$ which can be engaged with plain projecting end portions of the screws.

To enable the interfaces $e$, $f$ of the junction piece, or both these faces and the faces $g$ which are in contact with end faces of the pipe ends $d$ or the pipe end and fitting, to be supplied with lubricating or sealing substance of a liquid or viscous character, we embed in one or each of the members $a$, $b$ of the junction piece a bored metal piece $p$ which communicates with a groove $r$ in one or each of the faces of the corresponding member $a$ or $b$, the outer end of this metal piece being closed by a hollow screw-threaded plug $q$ through which the said substance can be introduced by an injector.

By this invention I am able to effect a fluid tight connection between the flanged ends of glass pipes or glass pipes and valves or other fittings in a very convenient manner and with a minimum of risk of detrimentally straining or fracturing the pipes when the securing bolts or screws are tightened.

The invention is not limited to the example above described as subordinate details may be varied to suit requirements.

Having thus described my invention what I claim as new and desire to secure by Letters Patent is:

1. A glass pipe joint comprising a two part annular junction piece which is made from glass and has spherical interfaces and flat outer faces, and which is adapted to be mounted between flat faces of the glass parts to be connected, and means embedded in the two parts of the junction piece whereby these parts can be disengageably associated with the corresponding parts to be connected.

2. A glass pipe joint comprising in combination a two part annular junction piece which is made from glass and has spherical interfaces and flat outer faces, and which is adapted to be mounted between flat faces of the glass parts to be connected, and means embedded in at least one of the parts of the junction piece through which liquid or viscous lubricating or sealing substance can be supplied to the said interfaces.

3. A glass pipe joint comprising in combination a two part annular junction piece which is made from glass and has spherical interfaces and flat outer faces, and which is adapted to be mounted between flat faces of the glass parts to be connected, and means embedded in the two parts of the junction piece through which liquid or viscous lubricating or sealing substance can be supplied to both the said interfaces and the outer faces of the junction piece.

4. A glass pipe joint comprising in combination a two part annular junction piece which is made from glass and has spherical interfaces and flat outer faces, and which is adapted to be mounted between flat faces of the glass parts to be connected, means embedded in at least one of the parts of the junction piece through which liquid or viscous lubricating or sealing substance can be supplied to at least the interfaces of the junction piece, and additional means embedded in the two parts of the junction piece whereby these parts can be disengageably associated with the corresponding parts to be connected before all of the parts are assembled.

5. A glass pipe joint comprising in combination a two part annular junction piece which is made from glass and has spherical interfaces and flat outer faces, and which is adapted to be mounted between flat faces of the glass parts to be connected, nuts embedded in each of the parts to be connected, screws engaging the nuts and having plain projecting end portions, and bushes embedded in the junction piece and adapted to be engaged by the said end portions of the screws.

6. A glass pipe joint comprising in combination a two part annular junction piece which is made from glass and has spherical interfaces and flat outer faces, and which is adapted to be mounted between flat faces of the glass parts to be connected, means through which liquid or viscous lubricating or sealing substance can be supplied to at least the interfaces of the junction piece, nuts embedded in each of the parts to be connected, screws engaging the nuts and having plain projecting end portions, and bushes embedded in the junction piece and adapted to be engaged by the said end portions of the screws.

JOHN ENGLISH.